United States Patent
Manchester

(10) Patent No.: US 7,146,436 B1
(45) Date of Patent: Dec. 5, 2006

(54) SYSTEM AND METHOD FOR ACTIVATING AND DOWNLOADING EXECUTABLE FILES FOR A LINE CARD WITHOUT REQUIRING THE USE OF BOOT CODE ON THE LINE CARD

(75) Inventor: E. Barton Manchester, Cotati, CA (US)

(73) Assignee: Cisco Technology, Inc., San Jose, CA (US)

( * ) Notice: Subject to any disclaimer, the term of this patent is extended or adjusted under 35 U.S.C. 154(b) by 997 days.

(21) Appl. No.: 09/583,445

(22) Filed: May 30, 2000

(51) Int. Cl.
*G06F 3/00* (2006.01)
*G06F 13/00* (2006.01)

(52) U.S. Cl. ............... 710/10; 710/8; 710/9; 711/152; 713/1; 713/3; 714/1; 714/2

(58) Field of Classification Search ............ 710/8–10; 713/1, 2, 3; 714/1, 2; 711/152
See application file for complete search history.

(56) References Cited

U.S. PATENT DOCUMENTS

| | | | |
|---|---|---|---|
| 5,051,982 A | 9/1991 | Brown et al. ............... 370/58.2 |
| 5,208,803 A | 5/1993 | Conforti et al. ............... 370/13 |
| 5,283,827 A | 2/1994 | Conforti et al. ............ 379/399 |
| 5,815,706 A * | 9/1998 | Stewart et al. ................. 713/2 |
| 6,021,333 A | 2/2000 | Anderson et al. ........... 455/560 |
| 6,035,346 A * | 3/2000 | Chieng et al. ................ 710/10 |
| 6,094,575 A | 7/2000 | Anderson et al. ........... 455/422 |
| 6,154,465 A | 11/2000 | Pickett ....................... 370/466 |
| 6,266,340 B1 | 7/2001 | Pickett et al. ............... 370/442 |
| 6,272,144 B1 * | 8/2001 | Berenbaum et al. ........ 370/419 |
| 6,397,385 B1 * | 5/2002 | Kravitz ...................... 717/173 |
| 6,633,639 B1 * | 10/2003 | Ludford ..................... 379/244 |
| 6,669,096 B1 * | 12/2003 | Saphar et al. ............... 235/492 |
| 6,715,097 B1 * | 3/2004 | Kidder et al. .................. 714/2 |

* cited by examiner

Primary Examiner—Tammara Peyton
(74) Attorney, Agent, or Firm—Baker Botts L.L.P.

(57) ABSTRACT

A method is provided for activating a card in a network element comprising one or more switch cards. The method includes determining a type of the card. An executable file stored remotely from the card and switch cards is retrieved based on the type of the card. The executable file is downloaded to a memory for a processor on the card without using boot code on the card. The card is operated using the executable file.

31 Claims, 2 Drawing Sheets

SYSTEM AND METHOD FOR ACTIVATING AND DOWNLOADING EXECUTABLE FILES FOR A LINE CARD WITHOUT REQUIRING THE USE OF BOOT CODE ON THE LINE CARD

TECHNICAL FIELD OF THE INVENTION

This invention relates generally to the field of telecommunications and more particularly to a method and system for activating a line card.

BACKGROUND OF THE INVENTION

Telecommunications systems generally include modular line cards, in addition to one or more central cards. The line cards allow a variety of features to be incrementally added to the telecommunications systems. Each line card typically includes a microprocessor for controlling the line card. Boot code for the microprocessor is generally stored in a non-volatile memory for the line card so that it is available when the line card is activated. The boot code loads an executable file into the microprocessor's memory. The executable file may also be stored in a non-volatile memory for the line card or downloaded to the line card while running the boot code.

Disadvantages associated with storing boot code in a non-volatile memory for activating a line card include higher space requirements for the line card components, increased routing complexity and higher bill of materials costs. Another disadvantage is the loss of software resources needed to develop and track the boot code as a complete software design. Also, the boot code may contain hidden software bugs.

Recently, executable files for line cards have been provided by a common switch card, which downloads an executable file to a line card without using boot code. However, this method requires every switch card to be updated and maintained in order to provide the appropriate version of an executable file to a line card. In addition, the form of memory used in the switch card is relatively expensive, and the number of line card types which may be supported in this way is limited by the amount of memory available on the switch card.

SUMMARY OF THE INVENTION

In accordance with the present invention, a method and system for activating a line card are provided that substantially eliminate or reduce disadvantages and problems associated with previously developed systems and methods. In particular, the executable file for a line card is directly loaded into the card's microprocessor memory from a dedicated download card, remote server or other suitable element in order to eliminate the need for boot code and for a non-volatile memory on the line card.

In one embodiment of the present invention, a method is provided for activating a card in a network element comprising one or more switch cards. The method includes determining a type of the card. An executable file stored remotely from the card and switch cards is retrieved based on the type of the card. The executable file is downloaded to a memory for a processor on the card without using boot code on the card. The card is operated using the executable file.

In another embodiment of the present invention, a line card is provided for a network element comprising one or more line cards. The line card includes a processor, a memory and an activation system. The memory is associated with the processor. The activation system is operable to identify the line card to the network element, to hold the processor while the network element downloads an executable file for the line card to the memory without using boot code on the line card, and to release the processor subsequent to the downloading of the executable file. The processor is operable to operate the line card using the executable file.

Technical advantages of the present invention include providing an improved method for activating a line card in a telecommunications network. In particular, a dedicated download card, or other suitable element, downloads an executable file to a memory for the line card while a processor for the line card is prevented from accessing the memory. As a result, boot code for the line card does not need to be developed and tracked as a complete software design because no boot code is required. Therefore, the use of software resources is reduced and the potential for hidden software bugs in the boot code is eliminated.

Another technical advantage of the present invention includes providing an improved line card. In particular, the line card may be provided without a non-volatile memory. Accordingly, space requirements for components in the line card and routing complexity and bill of materials costs for the line card are reduced.

Yet another technical advantage of the present invention includes providing an improved method for providing an executable file for a line card. In particular, the executable file is stored in a central location and loaded into the line card's memory upon activation. As a result, the most updated version of the executable file is provided to the line card each time the card is activated or reset, and the executable file may be maintained and updated much more efficiently and cost-effectively.

Other technical advantages will be readily apparent to one skilled in the art from the following figures, description, and claims.

BRIEF DESCRIPTION OF THE DRAWINGS

For a more complete understanding of the present invention and its advantages, reference is now made to the following description taken in conjunction with the accompanying drawings, wherein like numerals represent like parts, in which.

DETAILED DESCRIPTION OF THE INVENTION

Figure 1:
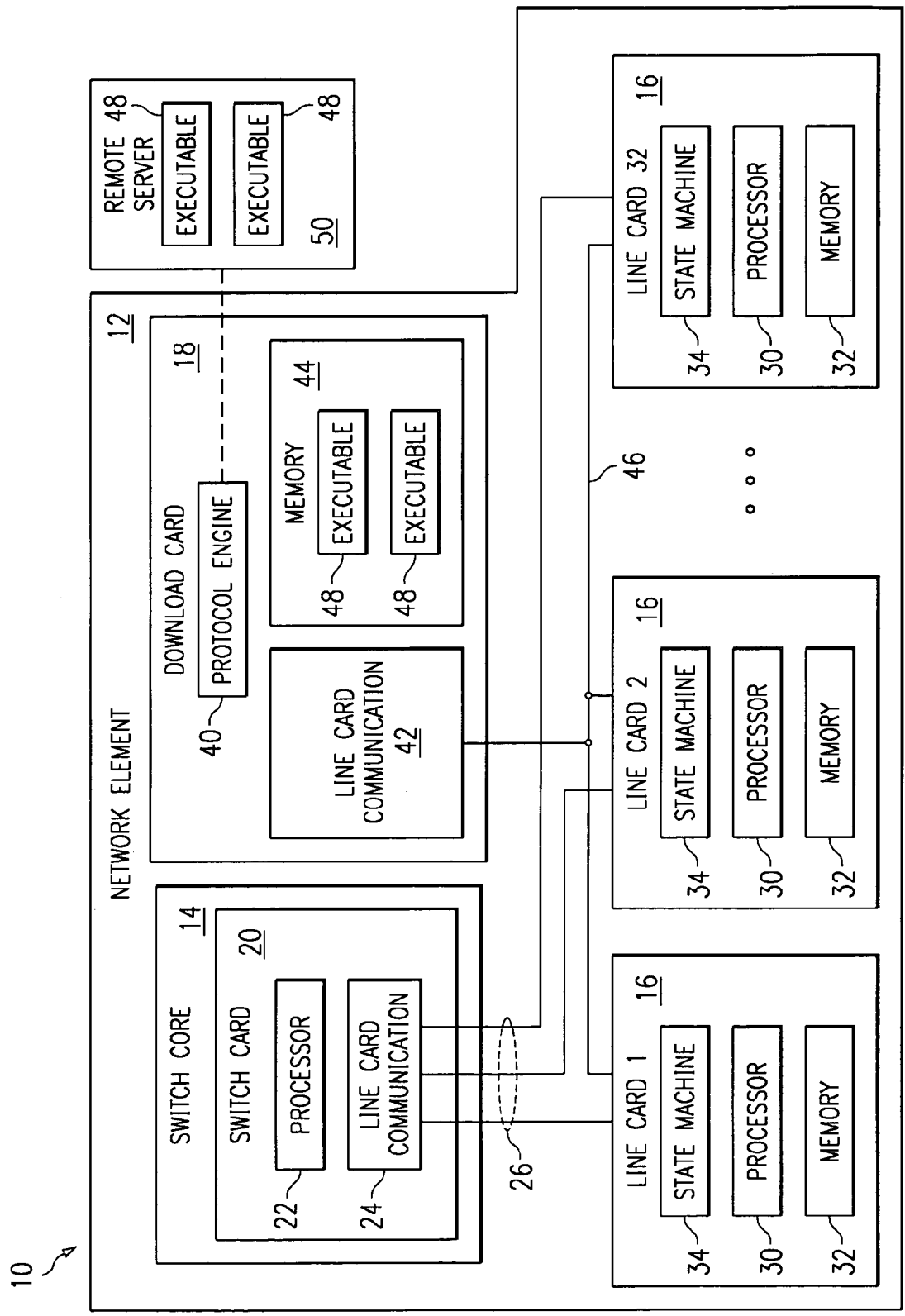
FIG. 1 is a block diagram illustrating a network element for a telecommunications network in accordance with one embodiment of the present invention.

FIG. 1 is a block diagram illustrating a system 10 comprising a network element 12 for a telecommunications network. The telecommunications network is a network that transmits voice, audio, video or other suitable types of information, and/or a combination of different types of information between source and destination points. The telecommunications network comprises one or more network elements 12, each of which comprises a switch core 14, a plurality of line cards 16, and a download card 18. The switch core 14 comprises one or more discrete switch cards 20.

The network element 12 may be part of an integrated access device that transmits data to and receives data from customer premise equipment, such as standard telephones, modems, computers, data phones and other devices capable of generating traffic for transmission in the telecommunications network. In accordance with one embodiment of the present invention, the integrated access device is implemented in a card shelf configuration with functionality of the device distributed between discrete cards 16, 18 and 20 connected over a back plane. The back plane includes a plurality of slots. The slots include receptors for receiving one or more line cards 16, at least one download card 18, and one or more switch cards 20. The back plane also includes one or more transmission buses for connecting the cards 16, 18 and 20. It will be understood that other types of access devices may be used in connection with the present invention.

The line cards 16, the download card 18, and the switch card 20 are each a discrete card configured to plug into the back plane. The cards 16, 18 and 20 each include logic stored in a computer-processable medium. The logic may be encoded in hardware and/or software instructions stored in RAM, ROM and/or other suitable computer-readable media for performing the functions associated with the cards 16, 18 and 20. As used herein, each means every one of at least a subset of the identified items.

Referring to FIG. 1, the switch core 14 switches traffic between the line cards 16, which transmit and receive customer traffic in the telecommunications network. The switch core 14 may be any suitable telecommunications switch capable of routing voice or other data traffic. According to one embodiment, the switch core 14 performs synchronous-based switching such as time-division multiplex (TDM) switching and cell-based switching based on a synchronized frame pulse. TDM-based switching provides time slot interchange for telephony connections, SONET SPEs, other synchronized traffic, and asynchronous traffic segmented into time slots. The cell-based switching switches asynchronous transport mode (ATM) cell traffic, ATM adaption layer cell traffic, and segmented packet traffic on a frame-based schedule. The switch core 14 may also convert traffic between the TDM and ATM realms to establish cross-connections between the line cards 16.

The switch core 14 receives and processes the TDM and ATM traffic using TDM-based switching and ATM cell-based switching. In switching service traffic received from the line cards 16, the switch core 14 performs queue management as well as broadcast and multicast operations. It will be understood that the line cards 16 and switch core 14 may each perform additional or different functions. It will be further understood that identified functions of the line cards 16 and the switch core 14 may be suitably off-loaded to the other.

In accordance with one embodiment, the switch card 20 provides functions such as master control, switching, communication within and outside of the network element 12, data storage, and the like. The switch card 20 performs these functions with a processor 22. Communication between the switch card 20 and the line card 16 may be provided through a line card communication interface 24. In one embodiment, this communication is provided over a time slot bus 26.

The line cards 16 allow features and capacity to be incrementally added to the system 10. Each line card 16 comprises a processor 30, a memory 32 for the processor 30, and activation logic 34. The processor 30 controls operations for the line card 16. During activation, as described in more detail below, the processor 30 may be held by suspension, shut down, or held by other suitable means in order to allow loading of an executable file into the memory 32. The memory 32 may store data while power is being provided to the line card 16. The memory 32 may be RAM, other volatile memory with fast access rates, or other suitable memory. The activation logic 34 provides data to the memory 32 for storage. The activation logic 34, which may comprise a state machine, may be implemented in an application-specific integrated circuit, a field-programmable gate array, discrete logic, software and the like. For the embodiment in which the activation logic 34 is implemented in a field-programmable gate array, software for the activation logic 34 may be downloaded by the download card 18 as described below in connection with the downloading of executable files for the line card 16.

The discrete download card 18 comprises a protocol engine 40, a line card communication interface 42, and a memory 44. The protocol engine 40 controls the download card 18. The line card communication interface 42 allows the download card 18 to communicate with the line card 16 over a bus 46 on the back plane. According to one embodiment of the present invention, the memory 44 may store a plurality of executable files 48 for downloading to the line card 16. According to another embodiment, the protocol engine 40 may be implemented in a switch card 20, as opposed to a download card 18. For this embodiment, the download card 18 may be eliminated from the network element 12 in order to provide additional space.

In accordance with an alternative embodiment, some or all of the executable files 48 for downloading to the line card 16 may be stored in a remote server 50 that is accessible by the protocol engine 40 of the download card 18, as opposed to being stored in the memory 44 of the download card 18. This alternative embodiment may provide more storage space, allowing a greater number of executable files 48 to be stored and thereby providing greater flexibility in terms of the variety of types of line cards 16 which may be used in the system 10. In addition, because the executable files 48 are stored in a central location for this embodiment, the files 48 may be maintained and updated much more efficiently and cost-effectively. However, the speed with which an executable file 48 is downloaded to the line card 16 may be reduced in this embodiment due to the distance between the remote server 50 and the network element 12.

Figure 2:
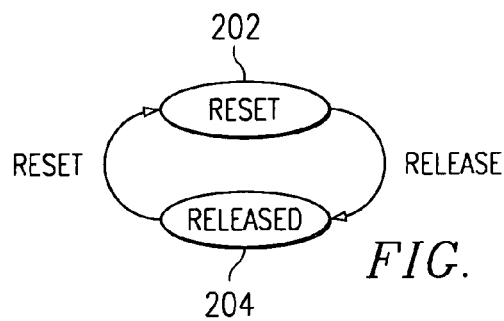
FIG. 2 is a state diagram illustrating states of the line card of FIG. 1 in accordance with one embodiment of the present invention.

FIG. 2 is a state diagram illustrating states 202 and 204 in which the line cards 16 may be placed in accordance with one embodiment of the present invention. Each line card 16 is placed in the reset state 202 when activated, reset, etc. While in the reset state 202, the processor 30 of the line card 16 is held and thus prevented from accessing the memory 32. The line card 16 transmits to the download card 18 a present message to indicate that the line card 16 is present in the network element 12 and powered up and a reset message to indicate that the line card 16 is in the reset state 202. According to one embodiment, the present message and the reset message each comprise a specified bit of data communicated over the bus 46 that is changed from either a logic low to a logic high or a logic high to a logic low.

The line card 16 also transmits an identifier message to the download card 18 to identify the type of line card 16 and thus the appropriate executable file 48 for loading into the line card 16 during activation. The line card 16 receives the executable file 48 from the download card 18 and the activation logic 34 stores the executable file 48 in the memory 32. The line card 16 waits for a release message from the download card 18, at which point the line card 16 transitions from the reset state 202 to the released state 204.

While in the released state 204, the processor 30 of the line card 16 operates normally and has access to the memory 32. The line card 16 no longer transmits a reset message to the download card 18. Communication is established between the line card 16 and the switch card 20. The line card 16 remains in the released state 204 until reset by either processor 22 or 30, by a power glitch, or for other suitable reasons.

Figure 3:
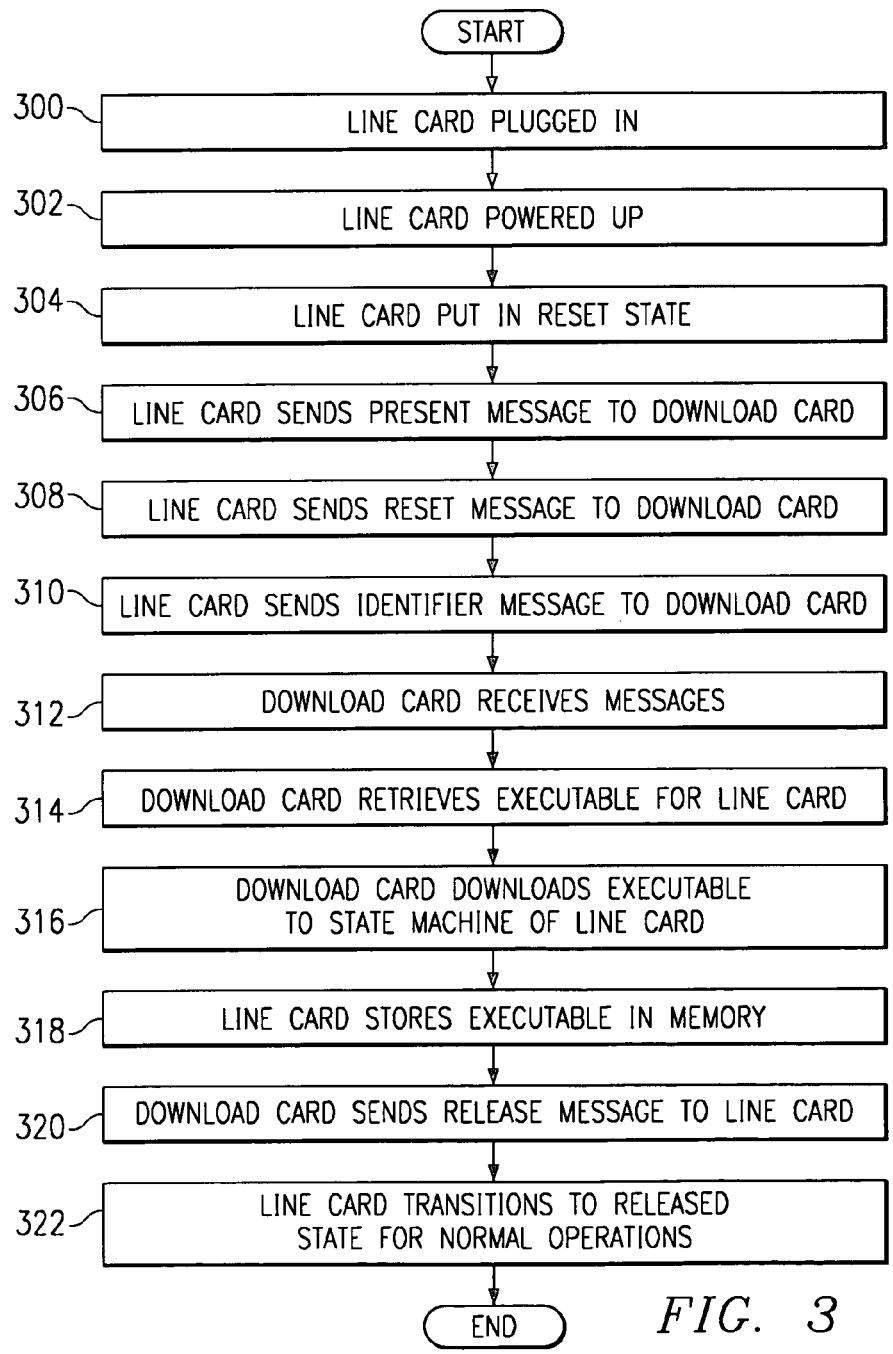
FIG. 3 is a flow diagram illustrating a method for activating the line card of FIG. 1 in accordance with one embodiment of the present invention.

FIG. 3 is a flow diagram illustrating a method for activating a line card 16 in a telecommunications network in accordance with one embodiment of the present invention. Although the illustrated embodiment is implemented with a download card 18, it will be understood that the method may also be implemented with a switch card 20 comprising the protocol engine 40 without departing from the scope of the present invention.

The method begins at step 300 where a line card 16 is plugged into a slot in the back plane of the network element 12. At step 302, the line card 16 is powered up. At step 304, the line card is automatically put into the reset state 202 in response to being powered up.

In step 306, the line card 16 transmits a present message to the download card 18 to indicate that it is present in the network element 12 and powered up. In step 308, the line card 16 transmits a reset message to the download card 18 to indicate that the line card 16 is in the reset state 202. In step 310, the line card 16 transmits an identifier message to the download card 18, which receives the present, reset and identifier messages in step 312. It will be understood that any combination of the present message, the reset message and the identifier message may be provided in a single message, as opposed to separately.

In step 314, the download card 18 retrieves an executable file 48 for the line card 16 based on the identifier message transmitted by the line card 16. As described above, the executable file 48 may be stored either in the memory 44 of the download card 18 or in a remote server 50. In step 316, the download card 18 downloads the executable file 48 directly to the memory 32 or directly through the activation logic 34 of the line card 16. In step 318, the activation logic 34 stores the executable file 48 in the memory 32 of the line card 16. In step 320, the download card 18 transmits a release message to the line card 16 to indicate that the entire executable file 48 has been downloaded. In step 322, the line card 16 transitions to the released state 204 for normal operations.

Thus, once the line card 16 transitions to the released state 204, allowing the processor 30 to access the memory 32, the appropriate executable file 48 has been stored in the memory 32. Therefore, the line card 16 is activated without the need for a non-volatile memory to store boot code or executable files 48 for the processor 30.

Thus, the cost of the line card 16 is reduced by eliminating non-volatile memory for storing code. Also, eliminating this memory provides more space for additional components on the line card 16 and reduces routing complexity. In addition, the line card 16 receives the most updated version of an executable file 48 each time the file 48 is loaded, and the executable file 48 may be maintained and updated much more efficiently and cost-effectively.

Although the present invention has been described with several embodiments, various changes and modifications may be suggested to one skilled in the art. It is intended that the present invention encompasses such changes and modifications as fall within the scope of the appended claims.

What is claimed is:

1. A method for activating a card in a network element comprising one or more switch cards, the method comprising:
    automatically holding a processor on the card and placing the card in a reset mode in response to powering up of the card;
    in response to placing the card in reset mode:
        communicating a signal indicating a type of the card;
        retrieving an executable file stored remotely from the card and switch cards based at least in part on the type of the card; and
        downloading the executable file to a memory for a processor on the card without requiring the use of boot code on the card; and
    removing the card from the reset state and operating the card using the executable file without the use of boot code.

2. The method of claim 1, the memory comprising a volatile memory.

3. The method of claim 1, downloading the executable file to a memory for a processor on the card without using boot code on the card comprising holding the processor while downloading the executable file and releasing the processor subsequent to downloading the executable file.

4. The method of claim 3, holding the processor comprising holding the processor with a state machine and releasing the processor comprising releasing the processor with the state machine.

5. The method of claim 4, the state machine comprising a field-programmable gate array.

6. The method of claim 4, the state machine comprising an application-specific integrated circuit.

7. The method of claim 4, the state machine comprising discrete logic.

8. The method of claim 1, further comprising providing a dedicated download card operable to retrieve the executable file and download the executable file.

9. The method of claim 8, further comprising transmitting a present message for the card to the download card.

10. The method of claim 8, further comprising transmitting a reset message for the card to the download card.

11. A system for activating a card in a network element comprising one or more switch cards, the system comprising:
    a line card comprising a processor and an associated memory and operable to hold the processor and place itself in a reset mode automatically upon powering up of the card;
    a common card operable to communicate with a plurality of line cards and operable, while the line card is in a reset mode, to communicate a signal indicating a type for the line card, to retrieve an executable file for the line card based at least in part on the type of the line card, the executable file stored remotely from the line card and the common card, and to download the executable file to the memory on the line card without requiring the use of boot code on the line card; and
    the processor operable to operate the line card using the executable file without the use of boot code on the line card.

12. The system of claim 11, the memory comprising a volatile memory.

13. The system of claim 11, further comprising a state machine operable to hold the processor while downloading the executable file and to release the processor subsequent to downloading the executable file.

14. The system of claim 13, the state machine comprising a field-programmable gate array.

15. The system of claim 13, the state machine comprising an application-specific integrated circuit.

16. The system of claim 13, the state machine comprising discrete logic.

17. The system of claim 11, the common card comprising a dedicated download card.

18. The system of claim 11, the common card comprising a switch card.

19. The system of claim 11, further comprising a server remote from the common card, the server comprising a memory operable to store the executable file.

20. A line card for a network element comprising one or more line cards, the line card comprising:
    a processor;
    a memory associated with the processor;
    an activation system operable to place the line card in a reset mode automatically upon powering up of the card and, while in the reset mode, operable to identify the line card to the network element, to hold the processor while the network element downloads an executable file for the line card to the memory without requiring the use of boot code on the line card, and to release the processor subsequent to the downloading of the executable file; and
    the processor operable to operate the line card using the executable file without the use of boot code on the line card.

21. The line card of claim 20, the memory comprising a volatile memory.

22. The line card of claim 20, the activation system comprising a state machine.

23. The line card of claim 22, the state machine comprising a field-programmable gate array.

24. The line card of claim 22, the state machine comprising an application-specific integrated circuit.

25. The line card of claim 22, the state machine comprising discrete logic.

26. A system for activating a card in a network element comprising one or more switch cards, the system comprising:
    logic stored on at least one computer-processable medium;
    the logic operable to place the card in a reset mode automatically upon powering up of the card and, while in the reset mode, operable to communicate a signal indicating a type for the card, to retrieve an executable file for the card based at least in part on the type of the card, the executable file stored remotely from the card and the switch cards, to download the executable file to the memory on the card without requiring the use of boot code on the card; and to operate the line card using the executable file without the use of boot code on the card.

27. The system of claim 26, the memory comprising a volatile memory.

28. The system of claim 26, the logic comprising software instructions.

29. A method for card activation in a network element, comprising:
    transitioning into a power up status at a card comprising a processor and a memory accessible to the processor;
    in response to the transition, communicating a signal at least partially identifying the card;
    receiving an executable file at the card in response to communicating the signal;
    while preventing the processor from accessing the memory, storing the executable file in the memory; and
    operating the line card using the executable file without the use of boot code on the card by executing the executable file using the processor.

30. The method of claim 29, wherein preventing the processor from accessing the memory comprises suspending the processor.

31. The method of claim 29, wherein preventing the processor from accessing the memory comprises shutting down the processor.

* * * * *